United States Patent
Wells et al.

(10) Patent No.: US 6,877,612 B2
(45) Date of Patent: Apr. 12, 2005

(54) FILTER CARTRIDGE FOR USE IN SEVERE ENVIRONMENTS

(75) Inventors: Rick J. Wells, West Henrietta, NY (US); F. Burke Allen, Houston, TX (US)

(73) Assignee: Graver Technologies, Inc., Glasgow, DE (US)

( * ) Notice: Subject to any disclaimer, the term of this patent is extended or adjusted under 35 U.S.C. 154(b) by 126 days.

(21) Appl. No.: 10/361,070

(22) Filed: Feb. 7, 2003

(65) Prior Publication Data

US 2004/0154977 A1 Aug. 12, 2004

(51) Int. Cl.$^7$ ................................................ B01D 29/17
(52) U.S. Cl. ...................... 210/457; 210/487; 210/489; 210/497.01; 210/500.1
(58) Field of Search ................................ 210/232, 323.2, 210/402, 457, 458, 486–489, 497.01, 500.1; 55/491, 510; 209/406

(56) References Cited

U.S. PATENT DOCUMENTS

| 1,319,309 A | * | 10/1919 | Smarch | 209/406 |
| 1,976,975 A | * | 10/1934 | Williams | 220/86.2 |
| 2,677,466 A | * | 5/1954 | Lowe | 210/489 |
| 5,223,134 A | * | 6/1993 | Riva | 210/232 |

* cited by examiner

Primary Examiner—Matthew O. Savage
(74) Attorney, Agent, or Firm—DLA Piper Rudnick Gray Cary US LLP

(57) ABSTRACT

A filter cartridge for use in severe or harsh applications, such as acidic or alkaline environments or hot or cold temperatures. The inventive filter cartridge is constructed of a central, perforated core having reinforcing bands on the ends which is surrounded by a continuous tube of filtration material and bounded by end caps. Rather than using potting compounds or other techniques which are susceptible to severe environments, the end caps are secured to the filter material enrobed core by way of mechanical fasteners, such as blind pop-rivets, screws, or nails.

8 Claims, 1 Drawing Sheet

US 6,877,612 B2

FILTER CARTRIDGE FOR USE IN SEVERE ENVIRONMENTS

BACKGROUND OF THE INVENTION

1. Field of Invention

This invention relates to an apparatus for filtration of particulate matter in severe environments and more particularly to a filter cartridge having end caps mechanically attached thereto that provide improved resistance to severe environments such as acids, extreme heat and cold.

2. Description of Prior Art

Many industrial processes generate desired end products or contaminants which, for one or more reasons, the manufacturer wishes to collect. In applications in which a liquid effluent is produced, porous filter media is normally utilized to remove suspended particles from the liquid. The contaminated fluid is passed through the porous filter media having an indicated pore size. The filtered liquid passes through while the contaminants or product of interest is retained in the filter pores. At the end of its useful life, the filter media can be disposed of, or if filtering an end product, the product can be removed from the media using the appropriate methods for such materials.

Filters used in such severe applications must be chemically and/or mechanically able to bear such conditions. Many filters currently used in industrial applications are generally comprised of a porous rigid core surrounded by filter media. The ends of the filter are usually capped and may be gasketed on either or both sides of the end caps. The end caps are traditionally attached to the core and enrobed media by adhesives or potting compounds, such as resins, epoxies, and polyurethanes or thermal/melt bonding. Tie rods or string winding are used by some manufactures to hold the media in place.

Many industrial processes utilize methods which are conducted in harsh conditions, such as extremely high or low temperatures, acidic or caustic environments, and combinations thereof or result in harsh byproducts. One such example is the production of nitric acid ($HNO_3$) in which trace amounts of platinum catalysts much be recovered from the process streams. Under such severe conditions, many traditional filters cannot be used, or fail during use, when the end caps become unsealed from the filtration media due to the action of the outside conditions on the potting compounds or beat seals. At elevated temperatures in acidic conditions, string wound elements tend to deteriorate. In many instances, the production facility is forced to change out the filters prematurely, thus wasting valuable time and financial resources.

It is therefore an object of the present invention to provide an apparatus that overcomes the problems of the prior art.

It is a further object of the present invention to provide an apparatus that overcomes the problems associated with deterioration of the means for attaching the filter end caps.

It is yet another object of the present invention to provide an apparatus that is easy and inexpensive to manufacture.

These and other objects of the invention will be apparent to those skilled in this art from the following detailed description of the preferred embodiments of the invention.

SUMMARY OF INVENTION

The instant invention is directed to a filter cartridge for filtering effluents in harsh environments, the filter cartridge comprising a perforated core having top and bottom ends, a reinforcing band encircling and attached to core at each of the top and bottom ends, filtration media, formed in a continuous tube enrobing the core and end caps fitted over each of the reinforcing bands on each of the top and bottom portions of the filtration media enrobed core. Mechanical fasteners, such as blind pop-rivets, are used to secure the end caps and filter material to the core by penetrating each said end cap, thorough the filtration media, the reinforcing bands and the core. Through the use of such mechanical fasteners, the problems of the prior art systems using adhesives or string to secure cartridge are avoided.

DESCRIPTION OF PREFERRED EMBODIMENTS

Figure 1:
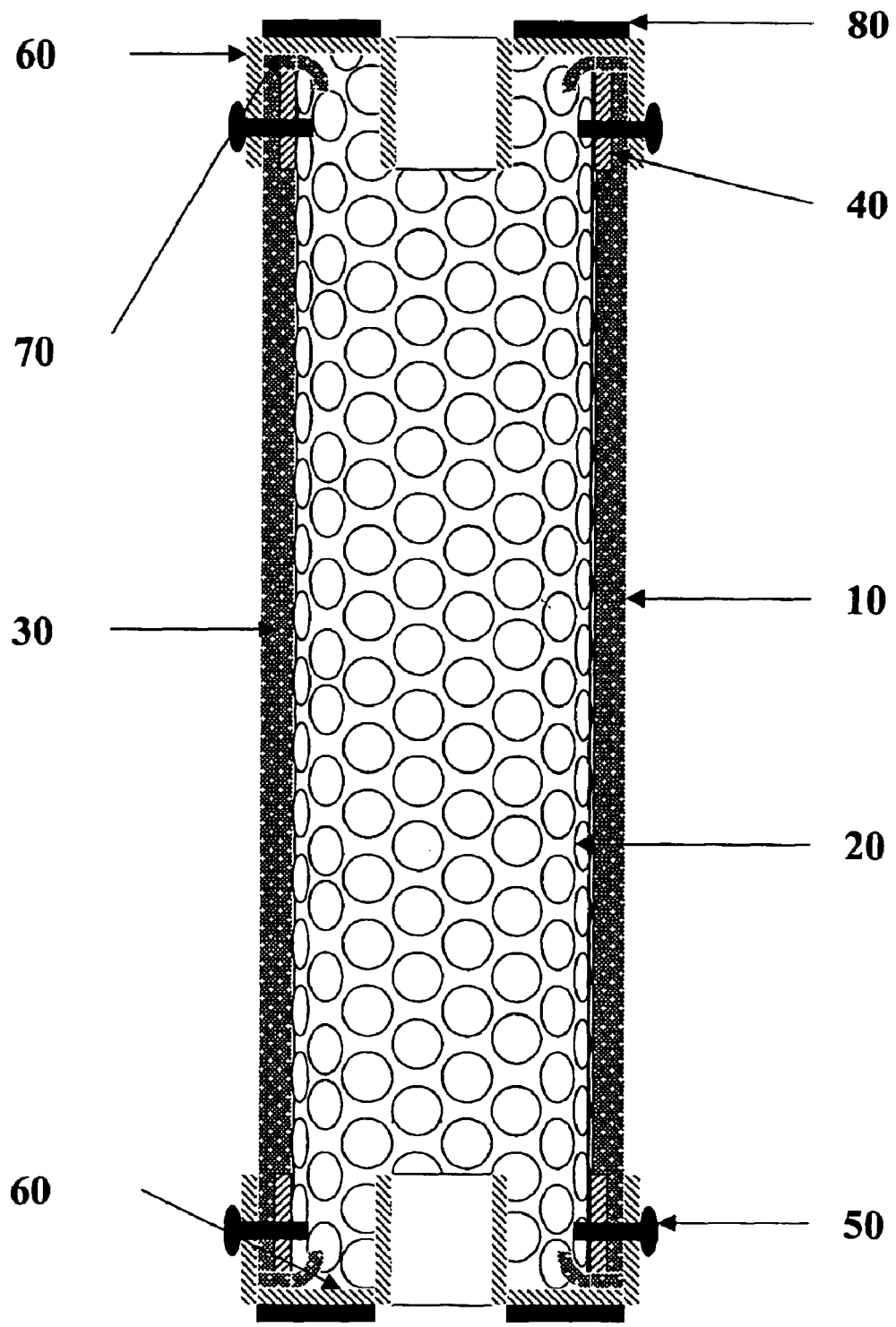
FIG. 1 is cutaway view of a filter cartridge constructed according to the invention.

The structure of the invention described herein is best understood by reference to FIG. 1. The filter cartridge 10 is generally comprised of an inner supportive core 20 which is surrounded by a layer of filter media 30. The filter cartridge 10 is generally in the form of a conventional cylindrical tube, although other shapes may be utilized depending on the desired application of the filter. The core 20 is preferably a perforated metallic tube, preferably constructed of 304 stainless steel, although other durable materials may be used, again depending on the end-use application of the filter. The function of the core 20 is to support the filter media 30, provide a flat seal surface and provide a surface to accept a mechanical fastener, such as fastening means 50. The core 20 is further reinforced by a metallic band 40 is spot welded to the inner diameter or outer diameter of the core.

The function of the filter media 30 is to filter the fluid or effluent for a given application and act as a seal at the interface between the core 20 and the end caps 60. The filter media 30 can be manufactured from a variety of materials to meet the given application, such as PTFE felt for nitric acid filtration, polyester, polypropylene, cotton, RYTON brand polyphenylene sulfide (PPS) resin (Chevron Philips) or NOMEX brand high temperature polyaramid fiber (DuPont). A continuous tube of the filter media 30 is slipped over the core 20 and the loose ends folded to the inside of the core 20. The filter media 30 then covers the edge of the core 20 and acts as a gasket seal between the core and the end caps 60. An optional internal gasket (not shown) may also be used.

The end caps 60 are preferably broadly shouldered on their inside and outside diameters to better accommodate receipt of the fastening means 50 and the optional internal gaskets. The end caps 60 further function to provide a flat sealing surface for installation. 304 stainless steel is favored due to the harsh conditions the inventive filter cartridge will be exposed to. A flat gasket 80 may be applied to the outside of one or both end caps to aid in sealing the filter cartridge 10 to the end-use equipment.

The end caps 60 and the filter media 30 are secured to the core by way of fastening means 50. The fastening means 50 are most preferable mechanical fasteners such as blind pop rivets, screws, tacks and similar penetrating fasteners. Again, the fastening means should be constructed of high durability material, such as 304 stainless steel. The fastening means 50 penetrate the end caps 60, filter media 30 and the core 20 forming a compression seal 70. The formed seal insures that all fluid flow passing across the filter element is forced to travel through the media 30 and not allowing a flow path around the media, commonly know as "by-pass."

In additional to enhanced sealing properties, the fastening means 50 also provide enhanced filter durability and longevity over prior art filters which use adhesives, potting compounds and string winding to seal the filter due to the ability of the fastening means 50 to resist the effects of harsh operating environments.

In addition to the structures, sequences, and uses immediately described above, it will be apparent to those skilled in the art that other modifications and variations can be made the method of the instant invention without diverging from the scope, spirit, or teaching of the invention. Therefore, it is the intention of the inventors that the description of instant invention should be considered illustrative and the invention is to be limited only as specified in the claims and equivalents thereto.

We claim:

1. A filter cartridge for filtering effluents in harsh environments, the filter cartridge comprising:
   (a) a perforated core having top and bottom ends;
   (b) a reinforcing band encircling and attached to the core at each of the top and bottom ends;
   (c) filtration media, formed in a continuous tube enrobing the core;
   (d) an end cap fitted over each said bands on each of the top and bottom portions of the filtration media enrobed core; and
   (e) a plurality of mechanical fasteners penetrating each said end cap, through the filtration media, the reinforcing bands and the core.

2. The filter cartridge of claim 1, wherein the mechanical fasteners are selected from the group consisting of screws, blind rivets, and tacks.

3. The filter cartridge of claim 1, wherein the perforated core is constructed of metal.

4. The filter cartridge of claim 1, wherein the filtration media is selected from the group consisting of PTFE, polyester, polypropylene, cotton, polyphenylene sulfide, and polyaramid.

5. The filter cartridge of claim 1, further comprising a gasket applied to each of said end caps.

6. An improved filter cartridge for use in severe environments having a core containing top and bottom ends, a reinforcing band encircling and attached to the core at each of the top and bottom ends, the core surrounded by filtration media and covered at the top and bottom ends by end caps, wherein the improvement comprises the end caps and filtration media sealed and secured together and to the core by at least one mechanical fastener on each end cap, wherein the at least one mechanical fastener penetrates each said end cap, through the filtration media, the reinforcing bands and the core.

7. The improved filter cartridge of claim 6, wherein the at least one mechanical fastener is selected from the group consisting of blind rivets, screws, and tacks.

8. The improved filter cartridge of claim 6, wherein the core and end caps are formed of stainless steel.

* * * * *